Nov. 10, 1959

J. A. HERRMANN ET AL 2,912,526

ELECTRICAL DISTRIBUTION SYSTEM

Filed Aug. 9, 1955

INVENTORS
John A. Herrmann
Louis W. Higgins
Charles W. Parmenter
BY J. Robert Schafer
ATTORNEY.

United States Patent Office 2,912,526
Patented Nov. 10, 1959

2,912,526

ELECTRICAL DISTRIBUTION SYSTEM

John A. Herrmann, Grosse Pointe Farms, Louis W. Higgins, Detroit, and Charles W. Parmenter, East Detroit, Mich., assignors, by mesne assignments, to I-T-E Circuit Breaker Company, Philadelphia, Pa., a corporation of Pennsylvania Application August 9, 1955, Serial No. 527,190

3 Claims. (Cl. 191—23)

This invention relates to electrical distribution systems generally and particularly to electrical distribution systems employing a movable collector for continuous take-off of electric current.

Systems of this type are particularly useful with industrial crane and hoist equipment and are constructed by joining sections of a duct end to end. Such duct sections comprise a metallic casing having insulated conductors secured therein. An embodiment of an invention of such a duct is disclosed in abandoned application Serial Number 82,078 which was filed March 18, 1949, with James A. Rowley and Joseph A. Messing as inventors and which was assigned to the assignee of the present application.

It is necessary, in such a duct, to provide a simple positive construction for securing the conductors in the duct casing. It is also necessary to provide a simple positive construction for joining the duct sections together to rigidify and integrate the sections to form a continuous system which will support the collectors and equipment supplied thereby. When used to supply industrial crane and hoist equipment the duct is subjected to severe strain particularly at points where duct sections are joined.

Accordingly, a principal object of the invention is to provide a duct type electrical distribution system having a novel construction for joining sections of the duct.

Another object is to provide a duct type electrical distribution system having a novel construction for securing conductors in the duct.

Still another object is to provide duct sections which are easily and securely assembled end to end to form an electrical distribution system.

Still another object is to provide a duct conductor holding means which positively secures and supports the conductors.

Still another object is to provide a duct conductor holding means which permits the duct casing and conductors to be easily and efficiently assembled to form a duct section.

Still another object is to provide a duct section having formations which interlockingly engage similar formations on another duct section to securely join the duct sections end to end.

Still other objects and features will be apparent after reference to the following specification and drawings in which.

The electrical distribution system disclosed and described in greater detail in the above mentioned abandoned application Serial Number 82,078 comprises generally a number of duct sections joined end to end. Each duct section is preferably of a standard length which is usually ten feet. Suitable electrical feed-in boxes are provided to connect the power source to the duct conductors. To take-off electrical power which may be utilized by cranes, hoists or other equipment, movable collectors are provided. A typical collector is disclosed in application Serial Number 332,404, filed January 21, 1953, and which is a division of abandoned application Serial Number 82,078. Such collectors are supported by rollers which move along the upper surface of the duct. It is therefore important that the duct sections when assembled provide a smooth, uninterrupted continuous supporting track for the collectors.

Figure 1:
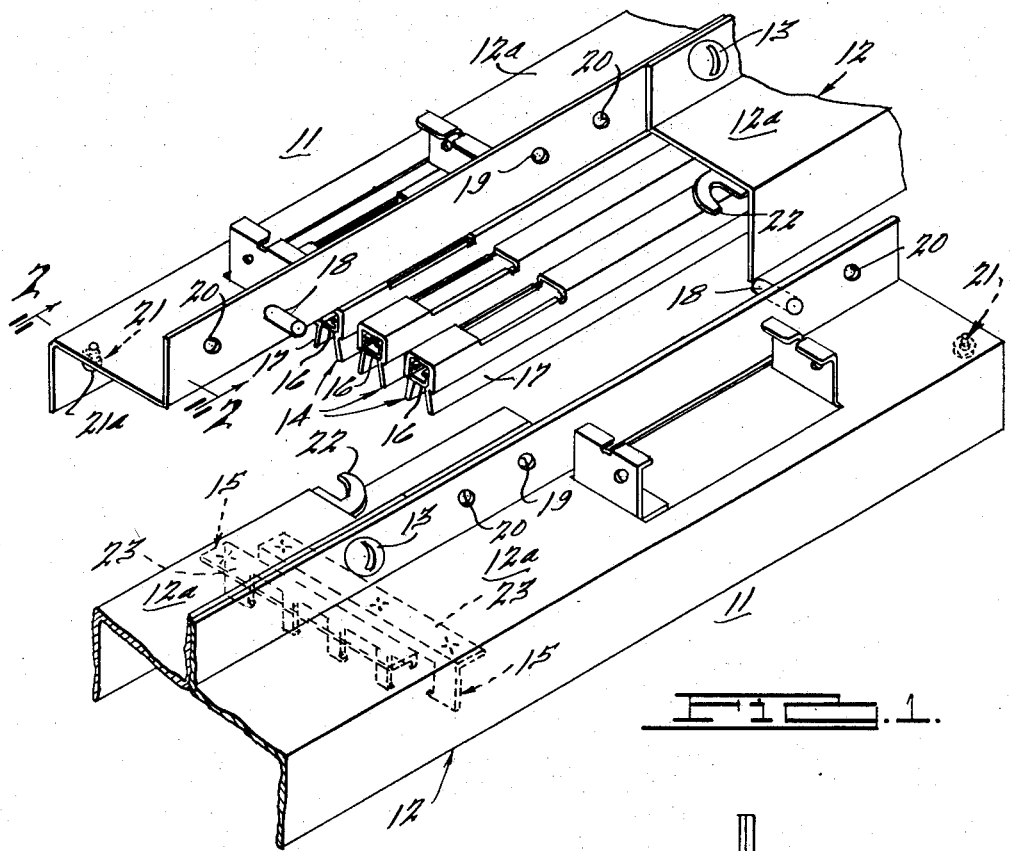
Fig. 1 is an isometric view of the mating ends of adjacent duct sections prior to their being joined.

Referring now to Fig. 1 of the drawings the end portions indicated generally as 11 of adjacent duct sections are shown in position to be joined together. Each duct section includes a casing 12 comprised of two ogee shaped metallic casing halves 12a matingly joined by their top flanges by bolts 13. Disposed within the casing 12 are a number of bus bar conductors indicated generally as 14. Bus bars 14 (Figs. 1, 3) are secured in duct casing 12 by clamps 15 which will be described later in greater detail. Each conductor 14 (Fig. 3) comprises a channel shaped bus bar 16 of electrically conductive metal such as copper partially enclosed by a U-shaped insulator 17. The lower surface of the bus bars 16 is exposed as shown (Fig. 3) to permit continuous contact by the contactors of the collector as it moves along the duct.

As shown in Fig. 1 a portion of each duct casing half 12a is cut away at each end to enable the duct sections to be lappingly joined. This cut-away is made from one half 12a of dust casing 12 at one end and from the other half 12a at the other end of the duct section, thus permitting a lap joint to be made at each end between adjacent duct sections. An opening having upstanding vertical walls formed at each end thereof is provided in the extending end of each duct casing half 12a to enable electrical connection to be made between the bus bars 16 of adjacent duct sections. Projecting laterally from the upper flange of the extending end of each duct casing half 12a is a locating pin 18 which is received by a pin hole 19 in the flange of the extending end of the adjacent duct section casing. Locating pins 18 serve to locate and position the duct ends prior to their being secured together by bolts (not shown) inserted through holes 20 also in the upper flange of casing halves 12a.

Figures 2, 3:
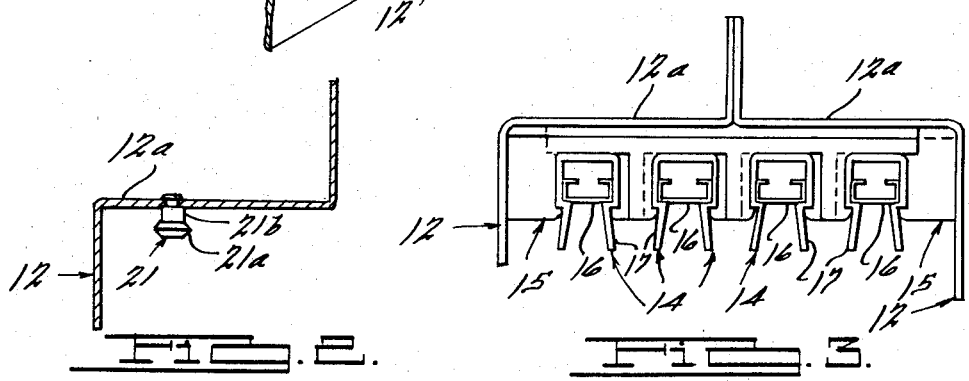
Fig. 2 is a partial section view on line 2—2 of Fig. 1.
Fig. 3 is an end view of a duct section.

Spaced slightly from the end of the extending half of each duct casing 12 (Figs. 1, 2) is a holding lug 21 shaped as shown with an enlarged head 21a a necked down body 21b and a rivet portion which is inserted into a hole in the duct casing and upset to thereby secure the lug in the duct casing half 12a. Arranged to be engaged with holding lug 21 upon joining the ends of the duct sections is a lug hook 22 which is welded to the under surface of the horizontal wall of casing half 12a which has been cut off (Figs. 1, 2).

To join the duct sections the adjacent ends 11 are positioned as in Fig. 1 with locating pins 18 opposite their respective holes 19. The duct ends 11 are then forced laterally together. As the ends are forced together the engagement of the necked down body portion 21b of lug 21 with the opening of hook 22 is facilitated by the beveled head 21a of lug 21. The body portion 21b of lug 21 is forced into the tapered opening of hook 22 to insure a tight engagement of these parts. Upon completion of the joining of the duct ends 11 bolts are inserted in holes 20 to tie the upper flanges of the two casing halves 12a together. A joint is thus obtained which secures the duct sections against relative displacement. It should be noted that the length of the necked down body portion 21b of lug 21 between the lower surface of casing 12a and the shoulder of head 21a is equal to the thickness of hook 22 thus preventing relative movement between these elements when they are fully engaged.

Figure 4:
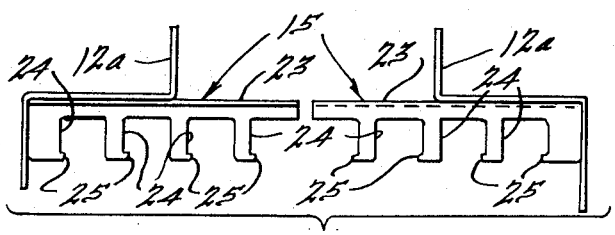
Fig. 4 is an end view of a portion of a duct section disassembled showing the parts in detail.

To secure the conductors 14 in casing 12 clamps 15 are provided. As shown in detail in Fig. 4 clamps 15 are formed of a right angle section of metal with the upper flange 23 (Fig. 1) welded to the under surface of the horizontal portion of casing 12. Each clamp 15 comprises two parts, one part being affixed to each casing half 12a. The depending flange is cut away as shown (Fig. 4) to form a series of holding lugs 24 having projecting teeth 25 extending laterally from their lower ends. The teeth 25 of the part of the clamp 15 affixed to the right hand duct half 12a (Fig. 4) are oppositely directed to the teeth 25 of the part of the clamp 15 affixed to the left half of the duct casing half 12a (Fig. 4). As shown in Fig. 1 the clamp halves are offset longitudinally on the respective duct halves 12a to permit the depending portions of the clamp 15 to slide along one another as the duct halves 12a are assembled.

To completely assemble a duct section, the conductors 14 are positioned in the cut away portions of one part of clamp 15 with one shoulder of the insulator 17 resting on the upper surface of teeth 25 of lugs 24. The duct halves 12a are then pushed together. Lugs 24 of the opposite part of clamp 15 are moved against the opposite side of insulators 17 with the teeth 25 being positioned beneath the other shoulder of insulator 17. The insulator 17 is thus surrounded by portions of both parts of clamp 15 (Fig. 3) and securely supported by teeth 25 of lugs 24. The duct section can be disassembled in reverse manner by separating the duct halves 12a permitting the conductors 14 to be withdrawn downwardly from the duct casing 12. Initial assembly and removal and replacement of conductors in the duct casing is thus facilitated.

From the foregoing description it can be seen that a novel duct is provided for an electrical distribution system.

For definition of the scope of the invention reference should be had to the following claims.

We claim:

1. A duct section for an electrical distribution system, said duct section including an elongated duct casing comprised of a first and a second mating half, a plurality of electrical conductors disposed in said duct casing and retaining means for said conductors, complementary joining means comprising a hook on one duct casing half and a lug on the adjacent duct casing half, said retaining means having a first and a second plurality of clamps secured to said first and second mating halves respectively, said retaining means clamps having lugs defining slots, said lugs having teeth, said teeth of said first plurality of clamps cooperating with the teeth of said second plurality of clamps to interlockingly secure said conductors in said duct casing; said retaining means being constructed to prevent movement of said conductors in directions lateral with respect to the longitudinal axis of said duct casing, said teeth of said first plurality of clamps being in alignment in a direction parallel to said longitudinal axis, said teeth of said second plurality of clamps being in alignment in a direction parallel to said longitudinal axis, said teeth of said first plurality of clamps being spaced from said teeth of said second plurality of clamps in a lateral direction with respect to said longitudinal axis, said retaining means being constructed to provide said plurality of conductors with a continuously accessible axially extending surface.

2. A duct section for an electrical distribution system, said duct section including an elongated duct casing comprised of a first and a second mating half, said halves being assembled in staggered relationship with a first half extending beyond a second half at one end of the duct section and the second half extending beyond said first half at the opposite end of said duct section, and joint means at the end of each duct section half for engaging complementary joint means on adjacent duct section ends, a plurality of electrical conductors disposed in said duct casing and retaining means for said conductors, said complementary joining means comprising a hook on one duct casing half and a lug on the adjacent duct casing half, said retaining means having a first and a second plurality of clamps secured to said first and second mating halves respectively, said retaining means clamps having lugs defining slots, said lugs having teeth, said teeth of said first plurality of clamps cooperating with the teeth of said second plurality of clamps to interlockingly secure said conductors in said duct casing; said retaining means being constructed to prevent movement of said conductors in directions lateral with respect to the longitudinal axis of said duct casing, said teeth of said first plurality of clamps being in alignment in a direction parallel to said longitudinal axis, said teeth of said second plurality of clamps being in alignment in a direction parallel to said longitudinal axis, said teeth of said first plurality of clamps being spaced from said teeth of said second plurality of clamps in a lateral direction with respect to said longitudinal axis.

3. A duct section for an electrical distribution system, said duct section including an elongated duct casing comprised of mating halves, said halves being assembled in staggered relationship with a first half extending beyond a second half at one end of the duct section and the second half extending beyond said first half at the opposite end of said duct section, and joint means at the end of each duct section half for engaging complementary joint means on adjacent duct section ends, a plurality of electrical conductors disposed in said duct casing and retaining means for said conductors, said retaining means comprising a plurality of clamps spaced in a direction parallel to the longitudinal axis of said duct casing, with alternate clamps being rigidly secured to opposite halves of said duct casing, said clamps cooperating for interlockingly securing said conductors in said duct casing and preventing lateral movement of said conductors, said retaining means being constructed to provide said plurality of conductors with a continuously accessible axially extending surface, said extending duct casing halves having locating means to index said casing duct ends prior to effecting a junction between said duct sections, said complementary joining means comprising a hook rigidly secured on one duct casing half and a lug on the adjacent duct casing half, said hook having a tapered wide mouthed opening, said lug having a large head with a tapered surface.

References Cited in the file of this patent

UNITED STATES PATENTS

| 289,165 | Strohm | Nov. 27, 1883 |
| 926,246 | Dorff | June 29, 1909 |
| 1,620,047 | Van Valkenburg | Mar. 8, 1927 |
| 1,669,257 | Lundahl | May 8, 1928 |
| 2,675,434 | Herrmann | Apr. 13, 1954 |